(No Model.)

C. F. BURNAP.
FLOUR BIN AND SIFTER.

No. 526,009. Patented Sept. 11, 1894.

Witnesses

Inventor
Charles F. Burnap,
By J. &c. McGill
Attorney.

UNITED STATES PATENT OFFICE.

CHARLES F. BURNAP, OF WARREN, OHIO, ASSIGNOR OF TWO-THIRDS TO HARMON AUSTIN, JR., AND KIRT E. PEW, OF SAME PLACE.

FLOUR BIN AND SIFTER.

SPECIFICATION forming part of Letters Patent No. 526,009, dated September 11, 1894.

Application filed October 26, 1893. Serial No. 489,192. (No model.)

*To all whom it may concern:*

Be it known that I, CHARLES F. BURNAP, of Warren, in the county of Trumbull and State of Ohio, have invented certain new and useful Improvements in Flour Bins and Sifters; and I do hereby declare the following to be a full, clear, and exact description of the invention, such as will enable others skilled in the art to which it appertains to make and use the same.

This invention contemplates certain new and useful improvements in flour bins and sifters and it has for its object the production of simple and inexpensive mechanism for readily and easily effecting the sifting of flour prior to its use and preventing the same from clogging the sifting mechanism.

The invention comprises a bin or receptacle having a sieve or screen in its bottom and lower drawer, a wheel movable over said sieve or screen having teeth and arms outwardly extended, and a crank-shaft extended through a tube attached to the bin and carrying a small gear wheel engaging the teeth of said wheel, an agitator-bar being extended up from the latter, all substantially as hereinafter fully set forth and particularly pointed out in the claims.

Figure 1:
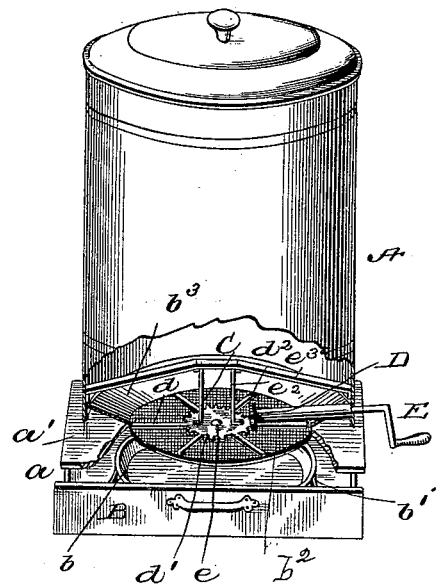
Figure 2:
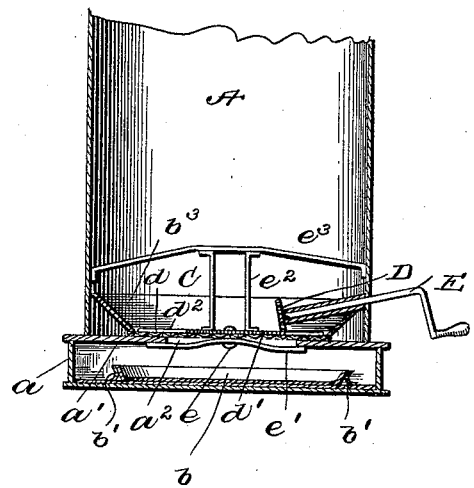

In the accompanying drawings:—Figure 1 is a view in perspective of my improved bin and sifter, with a portion of the former broken away. Fig. 2 is a vertical sectional view.

Referring to the drawings, A designates a bin or receptacle preferably of cylindrical form and designed to hold a suitable quantity of flour. At its lower end this bin is attached to a box $a$, the top $a'$ of which latter has a central opening $a^2$. B is a drawer having a pan $b$ connected thereto by bars $b'$. Over the opening $a^2$ is a sieve or screen $b^2$ through which the flour is designed to be sifted. A supplemental tapered wall $b^3$ directs the flour onto the sieve or screen.

C is an agitator, which consists of a wheel $d$ having teeth $d'$ and elongated or extended arms $d^2$ which project beyond said teeth. This wheel is pivotally mounted on a rod $e$ extended through a central hole in the sieve and connected at its lower end to a cross-bar $e'$ attached at its ends to the under side of the top $a'$. To this wheel are connected the legs $e^2$ of an approximately horizontal bar $e^3$ which acts to loosen the flour above the sieve.

D is a gear wheel in engagement with teeth $d'$ of wheel $d$ and is fast on the end of a crank-shaft E. This crank-shaft is extended through an inclined tube F connected to the side of the bin and having its outer end coincident with a hole in said bin. By turning this crank-shaft motion is imparted to the agitator-wheel and bar, and the flour is caused to pass through the sieve or screen into the pan.

The advantages of my invention are apparent. The sifting of flour is readily and easily accomplished and all clogging between the agitator wheel and the gear wheel in engagement therewith is prevented.

I claim as my invention—

1. The herein-described improved flour-sifter comprising the bin having a sieve or screen at its lower end, a wheel located directly over said sieve or screen and having circumferential teeth and elongated horizontal arms, an upper horizontal agitator bar having legs connected to said wheel, and the crank-shaft having a pinion meshing with said teeth of said wheel, substantially as set forth.

2. The herein-described improved flour-sifter comprising the bin, the sieve or screen at the lower end thereof, the box to which said bin is connected having an opening in its top beneath said sieve or screen, the drawer, the cross-bar extended across said opening, the agitator wheel mounted on said cross-bar and having teeth and elongated arms, the agitator-bar carried by said wheel, the tube connected to the side of said bin, the crank-shaft located in said tube, and the gear wheel on the inner end of said crank-shaft, substantially as set forth.

In testimony whereof I have signed this specification in the presence of two subscribing witnesses.

CHAS. F. BURNAP.

Witnesses:
 GEO. W. UPTON,
 JANE HORTON.